Aug. 22, 1972 P. AUER 3,686,059
APPARATUS FOR THERMOFORMING PACKAGES OR HEAT-SEALING
THERMOFORMED PACKAGES
Filed June 8, 1970 4 Sheets-Sheet 3

INVENTOR:
Peter Auer

BY
Karl J Ross
Attorney

United States Patent Office 3,686,059
Patented Aug. 22, 1972

3,686,059
APPARATUS FOR THERMOFORMING PACKAGES OR HEAT-SEALING THERMOFORMED PACKAGES
Peter Auer, Laupheim, Germany, assignor to Josef Uhlmann Maschinenfabrik, Laupheim, Germany
Filed June 8, 1970, Ser. No. 44,174
Claims priority, application Germany, June 10, 1969,
P 19 29 277.4
Int. Cl. B32b *31/20;* B29c *17/03*
U.S. Cl. 156—581                                      11 Claims

ABSTRACT OF THE DISCLOSURE

An apparatus usable for the thermoforming of packages from a synthetic-resin foil or for covering and sealing such packages.

(1) FIELD OF THE INVENTION

My present invention relates to a packaging apparatus and more particularly to an apparatus usable for the thermoforming of packages from a synthetic-resin foil or for covering and sealing such packages.

(2) BACKGROUND OF THE INVENTION

One of the newer methods of packaging consists of placing the goods to be packaged in a pocket or blister formed in a synthetic-resin foil, film or sheet, then covering this pocket or blister with another synthetic-resin sheet or film, and hermetically sealing the goods by welding or heat-sealing the periphery.

In order to make the most compact sturdy package the sealed lip must not extend outwardly beyond the outline of the package walls. This necessitates forming a flute, re-entrant portion or construction along the edge of the pocket so that some apparatus can be brought to bear on both surfaces of the edge lip thus formed, to seal the package. Such formations, however, have created difficulties with respect to removal of the package from either the mold in which it is thermoformed or from the device which welds it shut. The sides are also often formed with flutes which extend orthogonally to the edge lip to stiffen the package; these latter flutes further complicating formation and sealing of the packages.

Molds which spread into three or more pieces are known; they are often complicated, expensive, and their operation is rarely satisfactory. Also, the width of the web between adjoining packages formed in the same foil must be relatively large, especially in devices where the mold walls fold pivotally back away to free the package. In addition, the movable members must make considerable excursion to clear the package, thereby detracting from the speed with which the device may be operated.

(3) OBJECTS OF THE INVENTION

It is, therefore, an object of the present invention to provide an improved packaging apparatus of the above-described type.

Another object is to provide such an apparatus which overcomes the above-given disadvantages.

(4) SUMMARY OF THE INVENTION

I attain the above objects with an apparatus having means for advancing a foil formed with at least one pocket along a transport path between a pair of fixed tools, one of which is formed with a cavity opening toward the path for receiving the pocket. A linearly displaceable ram is provided under the tool with the cavity and carries a wall portion which acts to close one end of the cavity. This wall portion is pivotal on the ram about an axis transverse to the transport direction and to the ram displacement direction. The swingable wall portion is thus mounted on, carried by and entrained with the linearly reciprocable ram and moves with the latter relative to the remaining cavity walls both in the linear sense and in the pivoted sense.

Thus, the wall section, which is L-shaped and pivoted at the junction of its legs one of which serves to close the end of the cavity and the other of which carries an abutment engageable with the hollow tool, swings slightly outwardly to clear the recess or re-entrant formation in the side of the package, and is pulled out of the way by the ram. In this manner a narrow web between two neighboring packages is possible.

The two annular faces of the two tools serve to clamp the lip at the edge of a package, or serve to hold a foil which is deformed in a plug-assist thermoforming operation. The face around the edge of the cavity can itself be on a ledge running around this cavity so that the cavity in cross section is narrower at its opening than at its middle.

For a welding device, both ends of the tool are provided with pivotal wall portions supported on the ram and displaceable out of the path of the packages to allow a preformed pocket to pass into the cavity, be sealed all around its edges, and pass out. When the device is used only as a sealer, the floor of the cavity may be omitted while the cavity, except for the swinging flaps, is defined by walls which are merely bars supporting the marginal edge portions of the container.

(5) DESCRIPTION OF THE DRAWING

The above and other objects, features, and advantages will become apparent from the following description, reference being made to the accompanying drawing, in which.

(6) SPECIFIC DESCRIPTION

Figure 3:
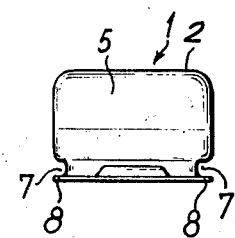
FIG. 3 is an end view of a package according to the present invention.
Figure 4:
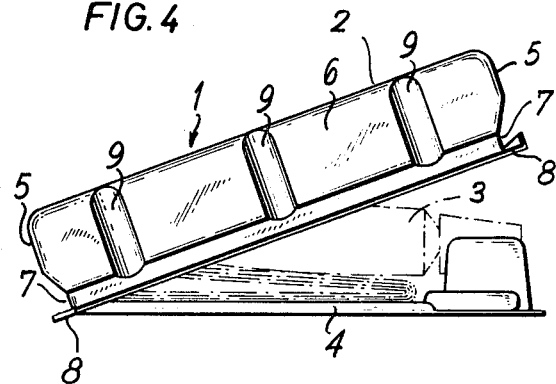
FIG. 4 is a side view of the package partly open.
Figure 5:
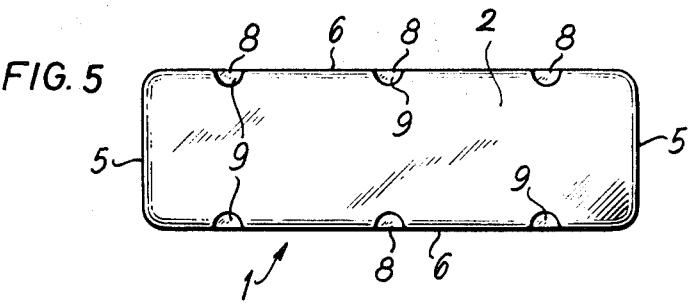
FIG. 5 is a top view of the package of FIG. 3.

A package according to my present invention is shown in FIGS. 3, 4, and 5 at 1. It is elongated and has end walls 5 and side walls 6. This package 1 has a closed transparent top 2 and a lip 8 on its other side. A flute 7, formed by a re-entrant portion extending all the way around the package 1 insets this lip 8 so that it does not extend beyond the planes of the walls 5 or 6. Goods 3 supported on a base 4 are held in the package 1 with the two heat-sealed together at the lip 8. Flutes 9 orthogonal to the flute 7 serve to stiffen the package 1, which is entirely made of a thermoplastic resin such as polystyrene, vinyl, or a cellulosic plastic.

Figure 1:
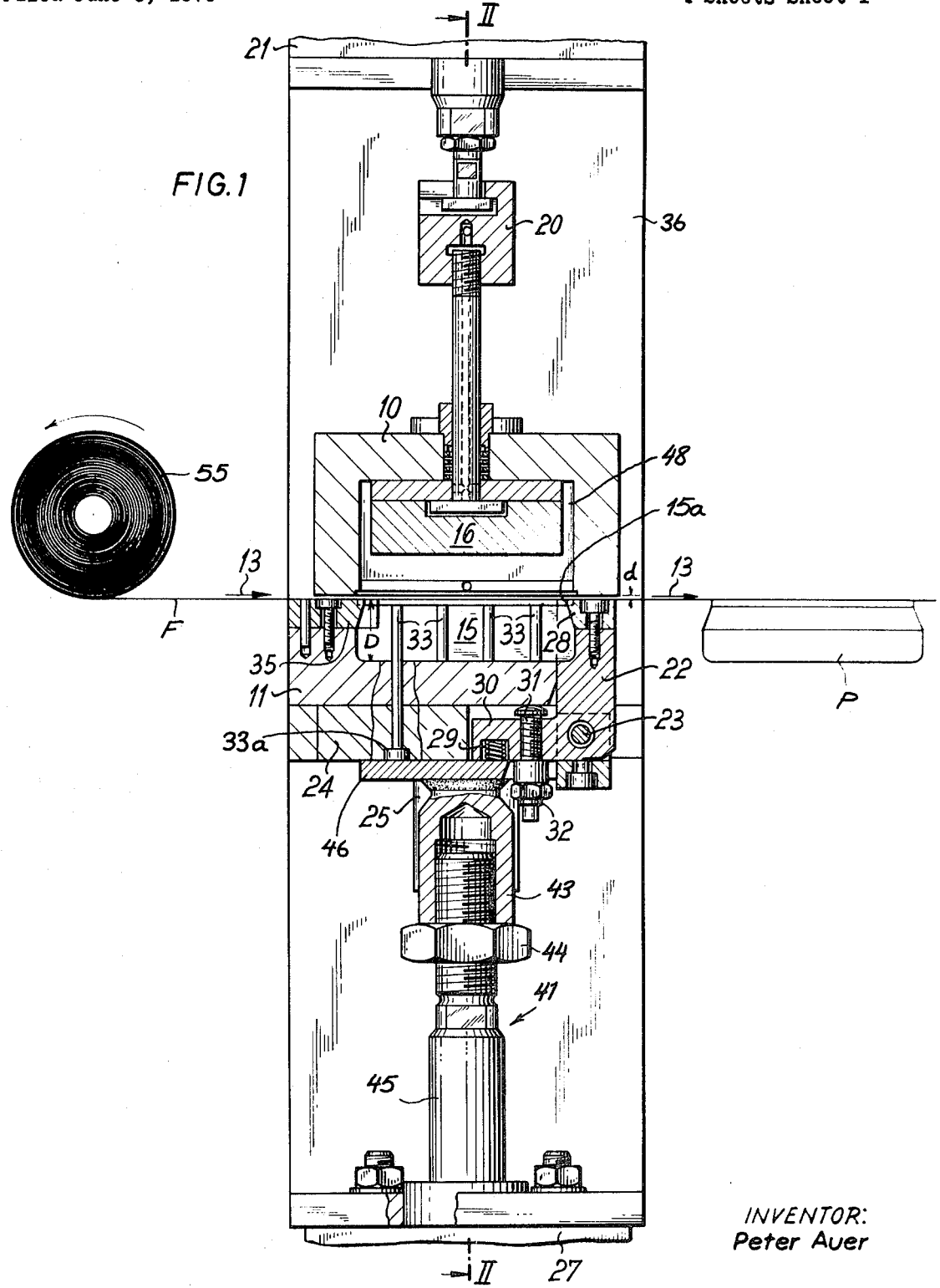
FIG. 1 is a vertical longitudinal section through an apparatus according to the present invention.
Figure 2:
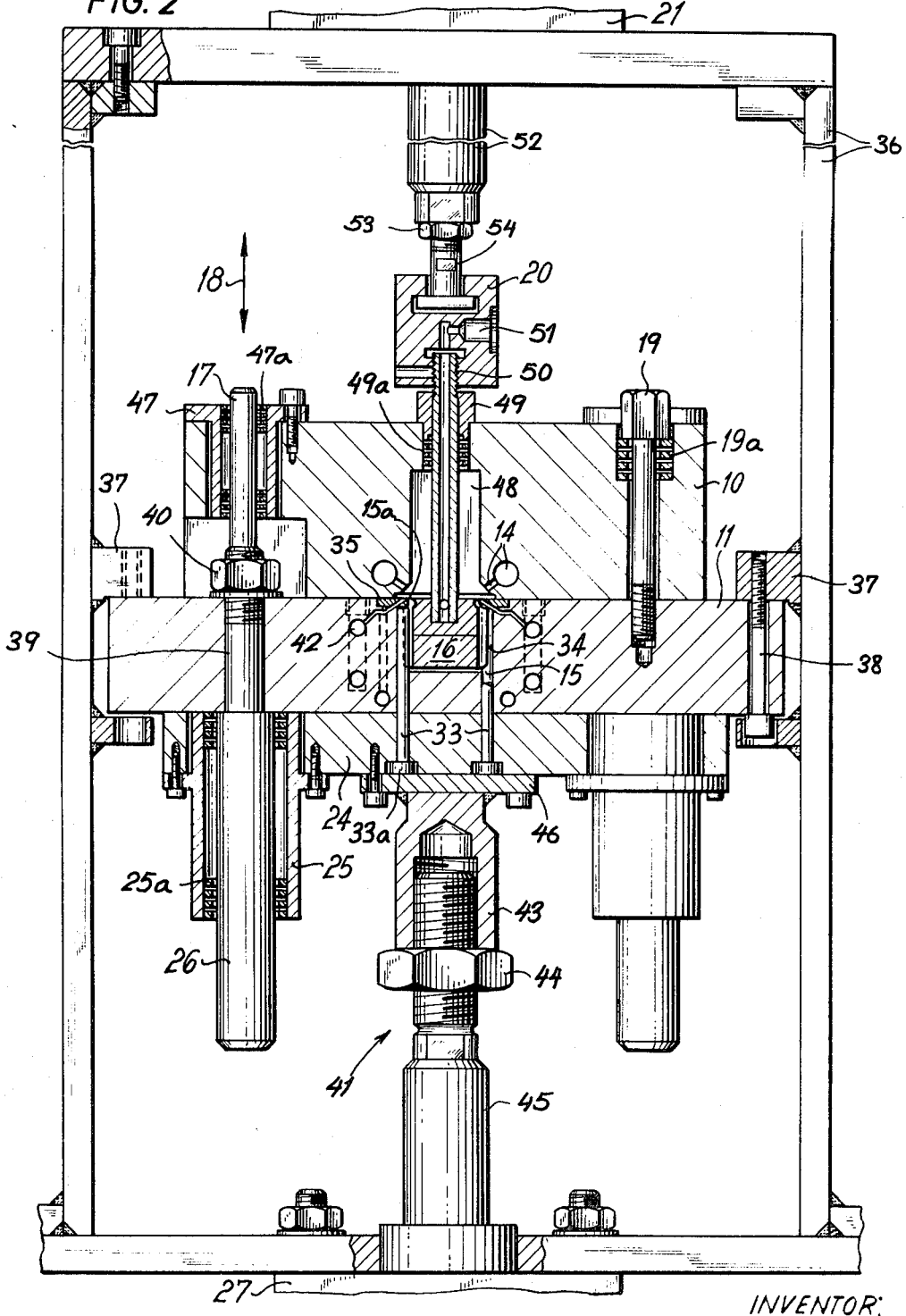
FIG. 2 is a vertical cross section taken along the line II—II of FIG. 1.

The device shown in FIGS. 1 and 2 forms the package shown in FIGS. 3–5. It consists basically of an open frame 36 having inwardly extending tabs 37 to which is fastened a tool plate 11 by machine screws 38. A plurality of stepped cylindrical rods 39 pass through this plate 11 and are held tightly in place by nuts 40 so that they extend all parallel to each other and at right angles to the plate 11, with a narrow portion 17 sticking up and a thick portion 26 extending downwardly.

The plate 11 is formed with a mold cavity 15 of generally parallelepiped shape, conforming exactly to the shape of the package 1 except as regards the grooves 9. Bolted to the top of this plate 11 is a U-shaped plate 35 provided with an inwardly protruding ledge that forms most of the groove 7 in the finished package. Vertical holes 34 passing through the plate 11 form semicylindrical recesses in the side walls of the cavity 15 in which half of the upper ends of rods 33 are received, to form the grooves 9 in the finished package 1. Passages 42 are provided in the plate 11 for heating it during thermoforming.

Below the plate 11 is a ram 41 mounted on a hydraulic cylinder 27 for vertical reciprocable movement as shown by arrow 18. A piston rod 45 of cylinder 27 is threaded into a sleeve 43 and locked by a nut 44. This sleeve 43 is welded to a plate 46 screwed on a block 24. Sleeves 25 fitted with washers 25a ride on the guide rods 26. The rods 33 have heads 33a which are clamped between the plates 24 and 46 so that, as the plates 24 and 46 ride up and down, the upper ends of the rods 33 form semicylindrical bosses in the cavity 15 or are withdrawn from this cavity.

Figure 6:
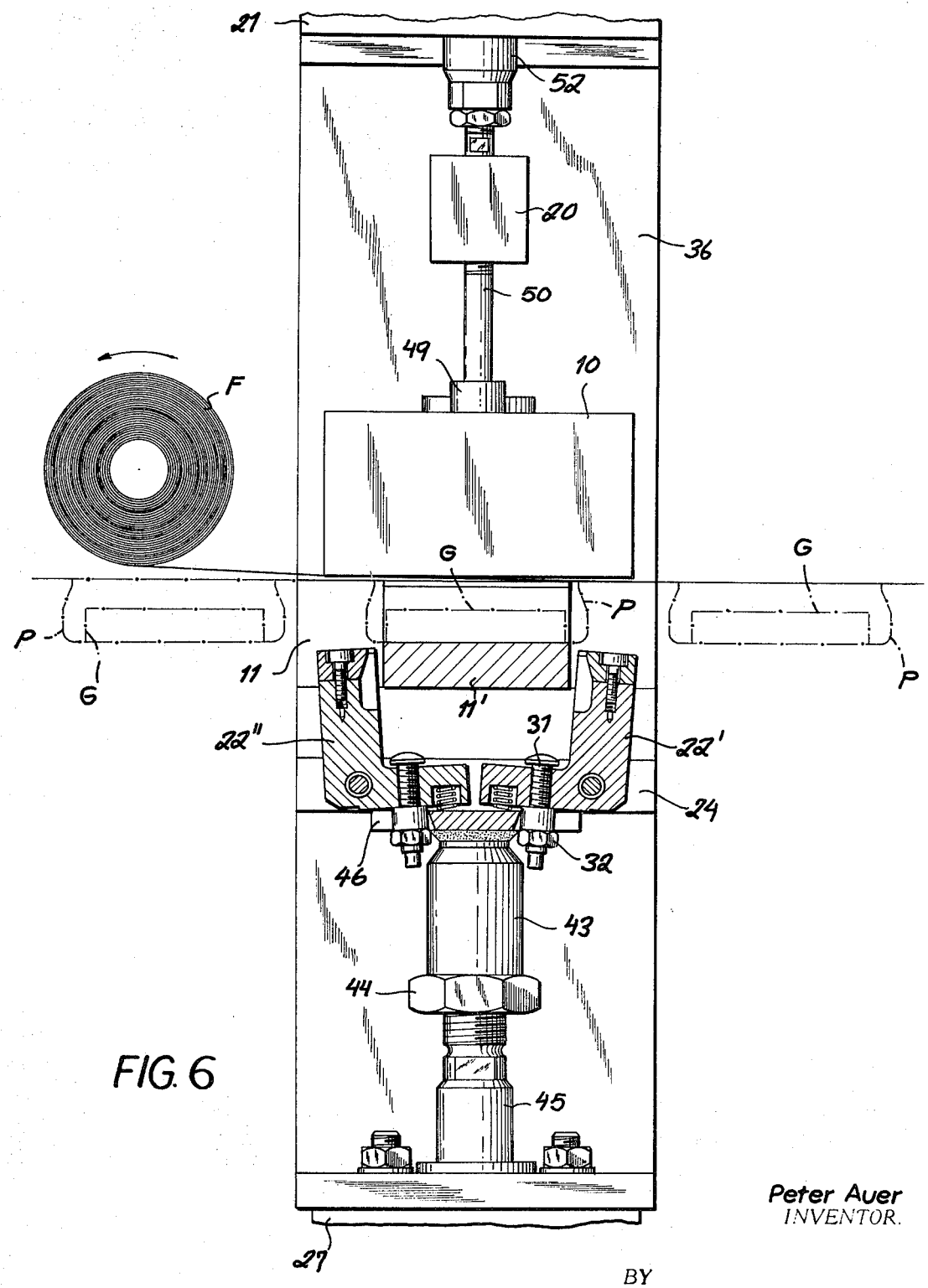
FIG. 6 is a view similar to FIG. 1 showing another embodiment of the apparatus according to the present invention.

A pivot pin 23 extending transverse to the direction 18 defines a pivot axis for an L-shaped wall portion having 15a, when the ram 41 is pushed fully upwardly as shown in FIGS. 1 and 2 (compare FIG. 6 for open position of wall portion).

An abutment screw 31 is threaded through the leg 30 and can be locked in place by a nut 32 to adjust the closed position of this wall portion. The head of this screw 31 abuts the wall 11 as the ram is lifted to pivot the wall portion counterclockwise and close the mold. A spring 29 braced between the leg 30 and the plate 46 of the ram urges the wall portion outwardly, with clockwise rotation on tropping of the ram 41.

A plate 10 limitedly displaceable in the direction of the arrow 18 riding on the guide rods 17 via sleeves 47 and washers 47a. Bolts 19 pass through the plate 10 and are threaded into the plate 11, with springs 19a bearing between the heads of these bolts and the plate 10 to urge it downwardly in the direction 18.

The plate 10 is formed with a downwardly open cavity 48 which registers with the cavity 15 and into which open a plurality of passages 14 through which air can be injected for thermoforming a synthetic-resin foil F passing in direction 13 between the two plates 10 and 11. A plug 16 is received in this cavity 48 and is carried on a tube 50 passing through a guide 49 and washers 49a in the plate 10. The upper end of the tube 50 is threaded into a block 20 coupled in the direction of arrow 18 to a shaft 54 threaded in a piston rod 52 of a hydraulic cylinder 21 mounted on the frame 36. A lock nut 53 holds the shaft 54 on the rod 52. Steam or the like can be fed into the cavity 48 through an opening 51 communicating with the center of the tube 50 to heat and deform the foil F. FIG. 2 shows the plug 16 pushed all the way down into the cavity 15, clearing the inner ledge 15a of the cavity 15 to permit entry and exit since this plug 16 assists in the thermoforming, and is not intended to closely fit the cavity 15. In the fully withdrawn position shown in FIG. 1 the top of the plug 16 abuts the plate 10 and raises this plate against the force of the springs 19a to slightly separate the two plates 10 and 11 by a distance $d$ and thereby allow the foil to be advanced.

Thus, in operation the foil F is fed from a roll 55 into the apparatus held as shown in FIG. 1. Then the upper ram 52 moves the heated plug 16 down, and a pressure differential is created across the foil which is clamped between the plates 10 and 11 as soon as the plug 16 has dropped by the distance $d$ equal to the plate spacing. A pocket P is formed in the foil, having exactly the shape shown in FIGS. 3–5. Then the plug 16 and the plate 10 engaged thereby are raised back to the FIG. 1 position and the ram 41 is withdrawn downwardly. As this ram 41 drops, the wall portion 22 simultaneously drops and pivots outwardly to clear the groove 7 formed in the end of the package P, while the rods 33 are withdrawn to free the grooves 9. Once the ram 41 has dropped by a distance D equal to the depth of the cavity 15 it stops, and the roll 55 rotates as the foil F is advanced once again.

FIG. 6 shows an apparatus usable for sealing the edge of packages formed as shown in FIG. 1. This device is essentially identical to that of FIGS. 1 and 2, with like reference numerals referring to like structure. Here however two pivotal wall portions 22′ and 22″ are provided at opposite ends of the cavity 15′. The plate 11′ and plate 10′ merely serve to hold the package while it is being welded shut, so that no plug 16 and no rods 33 are necessary.

In operation the pockets P are advanced into the device with a foil F′ laid over them after they are filled with goods G. The ram 41 must be withdrawn by the distance D to accept the pocket with its overlying foil, then it rises, with its two wall portions 22′ and 22″ automatically pivoting inwardly into the closed position as their abutments engage the plate 11′. Heat is applied all around the edges of the pocket to weld it to its covering foil, then the device is opened, the sealed pocket is stepped out, and another pocket and foil F′ is stepped in.

In the case of a package formed of a foil where the pockets are formed at a distance from each other at least equal to the pocket length, the intervening foil web can simply be folded over and welded on three sides to make a fully closed package. In this case, the welding device can simply have one pivotal wall portion and can be open at the opposite end.

Although the device has been described here as having a lower fixed mold half or plate, and upper movable portion, nothing prevents the teachings of this invention from being applied to an apparatus having a horizontally opening mold.

I claim:

1. A packaging apparatus comprising:
   means for advancing a foil formed with at least one pocket along a transport path in one direction;
   a fixed tool along said path and having a cavity opening toward said path for receiving said pocket; said cavity being open at one end thereof in said direction;
   a ram linearly displaceable toward and away from said path adjacent said tool and provided with means exposed in said cavity and obstructing movement of said pocket therefrom in an advanced position of said ram but withdrawn from said cavity in a retracted position of said ram; and
   a wall portion engageable over said one end of said cavity to close the same at said one end and pivotal on said ram about an axis transverse to said transport path and to the ram displacement direction to clear said pocket for transport in said direction through said end.

2. The apparatus defined in claim 1, further comprising means for pivoting said wall portion to open said one end of said cavity including an abutment on said wall portion spaced from said axis and engageable with said tool.

3. The apparatus defined in claim 2 wherein said wall portion is substantially L-shaped and has a pair of L-profile legs with said pivot axis passing through the junction of said L-legs, one of said L-profile legs closably engageable over said one end of said cavity and the other of said legs being provided with said abutment, said means for pivoting said wall portion including a spring braced between one of said L-profile legs and said tool.

4. The apparatus defined in claim 1, further comprising a second tool displaceable toward and away from said first-mentioned tool to clamp said foil and means displacing said ram through a distance equal to the depth of said cavity, said tools being formed with annular registering faces flanking said foil, the face of said first tool lying around the edge of said cavity.

5. The apparatus defined in claim 4 wherein at least one of said tools is heated to soften said foil.

6. The apparatus defined in claim 5, further comprising means for forming a pressure differential across said foil clamped between said faces for thermoforming same.

7. The apparatus defined in claim 6, wherein said second tool includes a plug engageable with said foil to assist in deformation of same, and means for displacing said plug into and out of said cavity.

8. A packaging apparatus comprising:
means for advancing a foil formed with at least one pocket along a transport path;
a fixed tool along said path and having a cavity opening toward said path for receiving said pocket, said cavity being open at one end;
a ram linearly displaceable toward and away from said path adjacent said tool;
a wall portion engageable over said one end of said cavity to close same and pivotal on said ram about an axis transverse to said transport path and to the ram displacement direction;
a second tool displaceable toward and away from said first-mentioned tool to clamp said foil;
means displacing said ram through a distance equal to the depth of said cavity, said tools being formed with annular registering faces flanking said foil, the face of said first tool lying around the edge of said cavity, at least one of said tools being heated to soften said foil; and
means for forming a pressure differential across said foil clamped between said faces for thermoforming same, said second tool including a plug engageable with said foil to assist in deformation of same, and means for displacing said plug into and out of said cavity, said ram being provided with a plurality of pins engageable through said first tool and along the walls of said cavity to form stiffening grooves in said foil.

9. The apparatus defined in claim 8, further comprising means for pivoting said wall portion to open said one end of said cavity, said wall portion being substantially L-shaped and having a pair of L-legs with said pivot axis passing through the junction of said legs, one of said L-legs closeably engageable with said one end of said cavity and the other of said legs being provided with an abutment engageable with said tool to pivot said wall portion and close said one end, said means for pivoting said wall portion including a spring braced between one of said L-legs and said tool.

10. The apparatus defined in claim 9, further comprising a frame supporting said first tool and said means for displacing said plug, said first tool being provided with a plurality of guides extending transverse to said transport path, said second tool and said ram riding on said guides, said abutment being a threaded element threadedly engaged in said ram and rotatable to adjust said wall portion.

11. The apparatus defined in claim 8, further comprising means for pivoting said wall portion to open said one end of said cavity including an abutment on said wall portion spaced from said axis and engageable with said tool.

References Cited
UNITED STATES PATENTS

| | | | |
|---|---|---|---|
| 3,220,902 | 11/1965 | Edwards | 156—287 X |
| 3,078,911 | 2/1963 | Prewitt et al. | 156—581 |
| 2,797,727 | 7/1957 | Tadinger | 156—581 |

BENJAMIN A. BORCHELT, Primary Examiner

J. M. HANLEY, Assistant Examiner

U.S. Cl. X.R.

156—285, 500